United States Patent [19]

Johannes et al.

[11] 4,060,655
[45] Nov. 29, 1977

[54] RESIN COATED METAL SUBSTRATES

[75] Inventors: Gerhard Johannes, Taunusstein; Erwin Gemmer, Falkenstein; Hans-Joachim König, Frankfurt am Main-Fechenheim; Günter Reinhard, Frankfurt am Main-Schwanheim, all of Germany

[73] Assignee: Hoechst Aktiengesellschaft, Frankfurt, Germany

[21] Appl. No.: 708,729

[22] Filed: July 26, 1976

Related U.S. Application Data

[63] Continuation-in-part of Ser. No. 544,316, Jan. 27, 1975, abandoned.

[30] Foreign Application Priority Data

Feb. 2, 1974 Germany .............................. 2405111

[51] Int. Cl.$^2$ .......................... F16L 9/14; B05D 1/04; B05D 3/02; B32B 15/08
[52] U.S. Cl. ..................................... 428/35; 138/145; 260/47 EN; 260/37 EP; 427/29; 427/46; 427/195; 427/318; 428/418; 428/36
[58] Field of Search ............... 138/145; 428/35, 36, 428/418; 427/29, 46, 195, 318; 260/47 EN, 37 EP, 837 R, 824 EP

[56] References Cited

U.S. PATENT DOCUMENTS

| 3,053,823 | 3/1970 | Richart et al. .................. 156/244 |
| 3,438,937 | 4/1969 | Christie ............................ 156/330 |
| 3,533,985 | 10/1970 | Lantz et al. ................... 260/37 EP |
| 3,694,407 | 9/1972 | Krikorian .................... 260/47 EP |
| 3,842,035 | 10/1974 | Klaren ........................ 260/47 EN |

FOREIGN PATENT DOCUMENTS

1,155,408  6/1969  United Kingdom.

*Primary Examiner*—William R. Dixon, Jr.
*Attorney, Agent, or Firm*—Littlepage, Quaintance, Murphy, Richardson & Webner

[57] ABSTRACT

An article comprising a metal substrate in the form of a pipe or a container, said substrate being coated with a hardened epoxy resin composition formed from (A) a solid epoxy resin based on epichlorohydrin and a component selected from the group consisting of (a) 4,4'-diphenylolpropane, (b) 4,4'-diphenylolmethane and (c) a combination of (a) and (b), (B) from 1 to 12% by weight based on the epoxy resin of at least one hardener for said epoxy resin selected from the group consisting of (d) compounds of formula

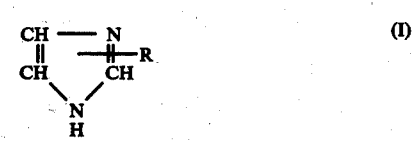

wherein R is hydrogen or an alkyl group of 1 to 6 carbon atoms or an aromatic hydrocarbon residue with 6 to 10 carbon atoms, (e) compounds of formula

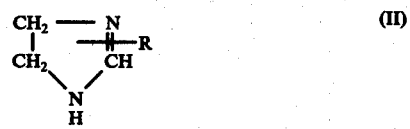

wherein R is hydrogen or an alkyl group having 1 to 6 carbon atoms or an aromatic hydrocarbon residue with 6 to 10 carbon atoms and (f) an adduct of any one of compounds (d) and (e) to an epoxy resin with an epoxy equivalent weight of from 50 to 2000, (C) a flow agent, (D) a thixotropic agent and a process of coating such metal substrate by means of heating said substrate to a temperature above the melting temperature of the epoxy resin component of an epoxy resin coating composition and sufficient to cure the said epoxy resin and powder-coating the said epoxy resin composition onto the hot surface of the substrate to provide a substantially uniform coating thereon by immediate hardening without any further processing step by means of the heat capacity of the hot substrate.

12 Claims, No Drawings

RESIN COATED METAL SUBSTRATES

This application is a continuation-in-part of application Ser. No. 544,316 filed Jan. 27, 1975, now abandoned.

The invention relates to metal substrates in the form of pipes or containers coated with a hardened epoxy resin composition and to a process for the manufacture thereof. The invention is especially concerned with large pipes coated with a coating composition of low toxicity which is resistant to heat and chemical corrosion and which is also electrically insulating.

It has been proposed to coat metal pipes, especially large pipes, with an outer coating of bitumen or high pressure polyethylene. Since high pressure polyethylene is very soft, good protection from mechanical stress, in particular blows, knocks and abrasions, is difficult to obtain. In this respect bitumen coatings have an even worse resistance to such mechanical treatment. Damage to the coating may cause corrosion of the metal and, for reasons of safety, makes large pipes unusable for the transporting of natural gas, mineral oil, petrochemicals, hot water, waste water and other gaseous and liquid chemical substances.

Furthermore, it has been proposed to coat pipes with a layer of a hardenable resin, for example a mixture of epoxy resin and coal tar asphalt in which coarse-grained fillers are embedded. (U.S. Pat. No. 3,258,032) In addition a method has been proposed for covering pipes with multiple coatings, in which a preheated pipe rotating about its longitudinal axis is provided with a thermosetting liquid coating mixture, and is subsequently hardened in a separate hardening process. (U.S. Pat. No. 3,369,922)

It has also been proposed to use powdered hardenable epoxy resin compositions containing, as curing agents, aromatic amines, acid anhydrides, dicyanodiamide or modified dicyanodiamides, i.e. dicyanodiamides activated by small quantities of accelerators. These so-called accelerators, which affect the hardening rate of the curing agents, are for example, mixtures of carboxylates of the metals lead, iron, cobalt, manganese, zinc or tin, with carboxylic acids or anhydrides or adducts of epoxy resins with imidazole derivatives, e.g. 2-methyl-4-ethyl-imidazole. (GB-PS No. 1,155,408)

It is further known to use heterocyclic compounds which possess a substituted imino group $>C=N-C$ and a secondary amino group as hardeners for epoxy resin compositions such as encapsulating compositions, adhesives, bonding agents and laminates. Proposed components of this kind are imidazole compounds such as 2-methyl-imidazole. Such combinations are applied in the form of solvents or pastes, but there is no reference or indication to use powdered combinations thereof for coating of substrates as pipes and containers, especially large pipes. (U.S. Pat. No. 3,438,937)

The hardenable epoxy resin compositions proposed hitherto however have the disadvantage that they have low heat-resistance, moreover, when the epoxy layer is damaged the action of warm alkali solutions, hot water or hot steam, leads to a loss of adhesion at the junction of the metal and the epoxy resin coating, resulting in corrosion underneath the coating. This sensitivity to alkalis is important in many fields of application, for example in building projects, where materials with an alkaline reaction, such as for example lime and cement, are usually present.

A coating moreover often contains pores, i.e. microscopic cavities which extend as far as the metal surface. Such pores are formed, for example, by the presence or formation of gaseous and other products when the hardening process is subject to side-reactions. These microscopic cavities are very often the cause of so-called point corrosion of the metal wall. The above mentioned disadvantages are especially undesirable in the coating of large pipes, since they lead to so-called delayed damage, which, for economic and technical reasons, is unacceptable. In addition the epoxy resin coating materials used hitherto often contain toxic components, such as aromatic amines as hardeners or lead-containing compounds as accelerators.

We have now found that metal pipes, containers and other articles may be provided with a coating which is more durable than the aforementioned coatings and is non-toxic. Thus according to the present invention we now provide an article comprising a metal substrate in the form of a pipe having at least 100 mm internal diameter or a container, said substrate being coated with a hardened epoxy resin composition formed from (A) a solid epoxy resin based on epichlorohydrin and a component selected from the group consisting of (a) 4,4'-diphenylolpropane, (b) 4,4'-diphenylolmethane and (c) a combination of (a) and (b), (B) from 1 to 12% by weight based on the epoxy resin of at least one hardener for said epoxy resin selected from the group consisting of (d) compounds of formula

wherein R is hydrogen or an alkyl group of 1 to 6 carbon atoms or an aromatic hydrocarbon residue with 6 to 10 carbon atoms, (e) compounds of formula

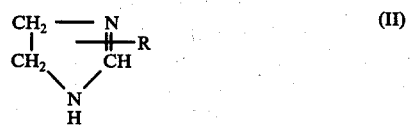

wherein R is hydrogen or an alkyl group having 1 to 6 carbon atoms or an aromatic hydrocarbon residue with 6 to 10 carbon atoms and (f) an adduct of any one of compounds (d) and (e) to an epoxy resin with an epoxy equivalent weight of from 50 to 2000, (C) a flow agent, (D) a thixotropic agent. The term "aromatic hydrocarbon" includes phenyl, benzyl and tolyl.

The epoxy resins of the adducts (f) are preferably in the range of 100 to 500 and particularly of from 185 to 195. They are based on epichlorohydrin and 4,4'-diphenylolpropane or 4,4'-diphenylolmethane. It is advantageous to use such adducts wherein the ratio of secondary amino groups to epoxy group is 1:0.7–1.3. If these adducts are present in the coating composition the amount of hardener can be reduced. The quantity used is at least 0.1%, preferably at least 1%, generally up to 10%, especially up to 5%, but sometimes up to 12% by weight based on the epoxy resin. Also mixtures of the hardeners of the invention can be applied. By variation of the hardening component it is possible to obtain epoxy coating compositions which have an optimal gel time with regard to their application.

According to a further feature of the present invention we provide a method of coating a metal substrate which comprises heating said substrate, for example a pipe or container, to a temperature above the melting temperature of the epoxy resin component of an epoxy resin coating composition as hereinbefore defined and sufficient to cure the said epoxy resin, for example to a temperature above 210° C, e.g. in the range from 250° to 330° C, and powder-coating, conveniently electrostatically or by powder-spraying, the said epoxy resin coating composition onto the hot surface of the substrate to provide a substantially uniform coating thereon.

It is possible to drop the temperature of preheating and curing the substrate to 190° C, but a post-curing step of about 10 minutes, preferably 5 minutes has to be introduced in the process.

As will be understood, prior to coating, the metal substrates should be thoroughly cleaned, for example by sand-blasting.

The method of coating should be so carried out that the composition melts to form as even film over the surface of the substrate and is immediately hardened, no further processing steps being required. The heat capacity of the hot metal substrate is itself generally sufficient with large metallic articles to cross-link the epoxy resin in a short time, for example less than a minute, without any further heating. It is surprising that despite the high temperature of the substrate during the application of the coating composition and the hardening thereof, no cracking of the coating occurs and neither a deterioration of the properties.

The epoxy resins used as component (A) of the coating compositions preferably have an epoxy equivalent weight in the range 600 to 2000, more preferably 700 to 1500 and particularly 875 to 1100. It may be advantageous to use mixtures of epoxy resins with different epoxy equivalent weights in order to improve the mechanical or other properties of the coating. Then the content of epoxy resins having an epoxy equivalent weight in the range 1500 to 2000 is preferably above 5 and not more than 20% by weight to avoid a deleterious effect on the flow properties.

The curing agent (component B) of the coating compositon) is preferably a compound of formula (I) or (II) wherein R represents hydrogen, a methyl, ethyl, n-propyl, n-butyl, n-hexyl, isopropyl, isobutyl, tert.-butyl, phenyl, benzyl group or any of the various tolyl groups, the R substituent being preferably in the 2-position. Aryl substituted imidazolines of general formula (II) are particularly preferred since these compounds retain their ability to cross-link epoxy resins at the high baking temperatures used and moreover due to their chemical stability improve the storability of the powdered coating composition. In particular 2-phenyl-2-imidazoline has been demonstrated to be an especially suitable curing agent. The baking temperatures generally used in the manufacture of the resin coated metal substrates according to the invention, such as pipes and containers, are generally in the range from 210° and 330° C and the curing agent selected should therefore be one which retains its ability to harden the resin at these temperatures. On the other hand dicyanodiamide, a conventional curing agent which is frequently used in other hardening processes, melts at 211° C under decomposition and its properties as a hardener are therefore seriously impaired above this temperature.

The flow agent (component C) of the coating composition) serves to improve the flow properties of the composition and at the same time to facilitate the wetting of the substrate and of any pigments which may be present. The quantity used is generally up to 5% by weight based on the epoxy resin. The preferred amount is in the range of from 0.1 by 1.5%, more preferably 0.3 to 1.0% by weight based on the epoxy resin and hardener. Preferred flow agents include for example polyvinylbutyral, silicon oils, silicon resin or a polyacrylate, for example a concentrate of an epoxy resin and a polyacrylate marketed by Monsanto under the trade name MODAFLOW ®.

The coating composition according to the invention also contains a thixotropic agent which serves to increase the viscosity of the molten compositon on the substrate and thus produce an even coating. The presence of fillers is in addition made redundant. The thixotropic agent is conveniently present in an amount of 1 to 5%, preferably 2 to 3% by weight based on the total composition. A preferred thixotropic agent is finely divided silicon dioxide.

The coating may if desired additionally contain pigments, for example non-toxic pigments which are conventionally used in coatings for metal pipes. Such pigments, preferably used in low concentrations, are preferably lead-free, resistant to high temperatures and to chemical attack, for example by water, acids, alkalis, soil, lime and cement. Titanium dioxide and chromium oxide green are two examples of pigments which may be present in the coating compositions used in the present invention. The total pigment content is generally not more than 40%, preferably not more than 20% by weight of the total composition. The pigment concentration is generally selected so as to affect the mechanical properties of the coating as little as possible. Pigment concentrations of more than 40% by weight are generally to be avoided since excessively high pigment contents result in poor resistance of the coating to mechanical stresses, poor wetting of the pigment and inhomogeneity of the coating.

The epoxy resin coating compositions used according to the invention are conveniently prepared from finely-divided starting materials so that the homogeneity of the starting mixture is improved and at least partial additon of the curing agent, for example the imidazoline to the epoxy resin is possible during the molten-liquid stage. The starting materials are mixed, for example in an extruder suited to duroplastic materials. After extrusion, which usually takes several minutes, 1 or 2 minutes, the reaction is immediately terminated by means of intensive cooling to prevent further enlargement of the molecules. However, it is also possible, particularly when using the unsubstituted components B) and/or the adducts, to apply an extrusion time of 15 to 30 seconds only. After cooling the epoxy resin composition is ground to a fine particle size, for example to a powder with a maximum particle size of 60 to 100 microns.

Pipes and containers are generally coated on the outer surfaces only for economic reasons, but it is also possible to coat only the inner surfaces or to coat both the outer and the inner surfaces. Thus the properties required of the coating depend on the particular application: in the case of internal coatings only the durability and possibly the resistance to temperatures up to for example 130° or 140° C are of importance, the mechanical strength being less critical since knocks and blows will occur only rarely.

We have found that a coating thickness of 100 to 2000 microns is generally adequate. However, thicker coatings may also be applied.

The invention relates in particular to the coating of large pipes, for example such pipes having an internal diameter of more than 100 mm and more usually pipes having a diameter of 300 to 1600 mm. Such pipes are often used for transporting petrochemicals and other gaseous and liquid chemicals at various temperatures and are laid above or below ground or under water. They may be made of various metals, but especially from iron and its alloys.

Coated metal substrates according to the invention have been subjected to a number of tests, the results of which are shown in the following Table I. The test articles consisted of resin coated pipe sections and steel sheets measuring 300 × 100 × 10 mm. The metal substrates were first pretreated with steel shots STS 20 to remove rust to grade 1 according to DIN 18364. Subsequently they were heated by gas burners to the desired surface temperature ± 10° C, after which the powdered coating composition was electrostatically applied and hardened.

The following tests were carried out using test articles of sheet steel measuring 300 × 100 × 10 mm coated with a 300 micron thick epoxy resin composition prepared according to Example 1 which follows. In tests (A) to (D) the coating was scored by the lattice cut method according to DIN 53151. The score marks produced were not sealed.

Test (A): Storage in 1 N NaOH solution at 50° C

The test articles were stored for 6 months at 50° C in a 1 N NaOH solution. Afterwards the loss of adhesion at the point of contact of the steel and the coating was estimated (evaluated according to DIN 53151).

Test (B): Boiling test in distilled water

The test was carried out as an alternating boiling test over 10 cycles, each cycle comprising heating for 20 hours at boiling temperature and storing at room temperature for 4 hours. The formation of bubbles (evaluated according to DIN 53209) and the loss of adhesion at the contact of steel and coating (evaluated according to DIN 53151) were estimated.

Test (C): Boiling test in tap water

The test was carried out analogously to Test B) except that instead of distilled water tap water of pH 6.9 with a carbonate hardness of 13.7° dH and a constant hardness of 10.9° dH was used.

Test (D): Bending test according to DIN 53152 and DIN 1605

Bending pegs of 20, 30 and 40 mm diameter were used. The tests were carried out at −5° C, +23° C, +50° C and +130° C.

In the further tests articles with unscored coatings were used.

Test (E): Presence of pores according to preliminary standard DIN 30670

The test articles were scanned with an electrode at a test voltage of 5kV + 5kV per mm thickness of coating. The presence of pores on the coated surface rather than the cut edge was studied.

Test (F): Impact resistance according to preliminary standard DIN 30670 (second 3.2.1 and 5.6)

For a coating thickness of 300 micron an impact energy of 3 Nm was used.

The following Examples illustrate the production of articles according to the present invention. P indicates parts by weight.

Example 1 (a) Preparation of a powdered epoxy resin coating composition 73.0 P of a coarsely ground epoxy resin (maximum particle size approximately 1 mm) based on 4,4'-diphenylolpropane and epichlorohydrin [softening point (according to Durrans): 93° C to 104° C; epoxy equivalent weight: 875–1000; viscosity: 430–630 cP in 40% solution (measured in ethylene glycol dibutyl ether at 25° C)], 3.0 P of a flow agent concentrate (MODAFLOW ® manufactured by Monsanto) consisting of the abovementioned epoxy resin and a polyacrylate in a weight ratio of 9:1, 4.0 P of 2-phenyl-2-imidazoline (melting point 101° C–103° C, determined according to the capillary method), 13.0 P of titanium dioxide KRONOS RN 57 P (KRONOS is a trade mark, manufactured by Kronos Titangesellschaft mbH.), 5.0 P of chromium oxide GX (manufactured by Bayer AG.) and 2.0 P of highly dispersed silicon dioxide were mixed in a sealed, fast-rotating mixer, firstly for 1 minute at 800 rpm (revolutions per minute), then for 1 minute at 1600 rpm and finally for 30 seconds at 800 rpm, the mixer being simultaneously cooled with water.

The mixture was plasticised and homogenized under the following conditions in a Buss-Ko-Kneader PR 46 (manufactured by Buss AG., Basle, Switzerland). Temperature of screw: 100° C; temperature of central part of housing: 105° C; temperature of outlet part of housing: 105° C; temperature of nozzle: 100° C; temperature of the molten homogenized mixture: 110° C; revolution rate of the proportioning screw: 18 rpm; revolution rate of the kneading screw: 62 rpm. The molten homogenized epoxy resin material was rolled out flat on two rollers, rotating in opposite directions and filled with cooling brine, whereby it was intensively cooled, and then was passed via an outlet caterpillar track on to a water-cooled steel belt, where an additional countercurrent of cold air was blown on to the epoxy resin material from above. The cooled epoxy resin material was coarsely ground, in known manner, e.g. in a blade mill (maximum particle size 4–5 mm). It was then finely ground in a sifter mill while being classified at the same time. The maximum particle size of the powdered composition was in the range 60 to 100 micron.

b. Manufacture of coated pipes

Large pipes were heated by means of ring or line burners arranged in a star shape. The pipes were moved along and rotated until they showed a constant temperature of 290° ± 10° C over the total length of the pipe. The subsequent electrostatic application of the powdered coating compositon to form a layer 300 microns thick was carried out according to conventional methods. The heat capacity of the large heated pipes was quite adequate to effect chemical cross-linking. The properties of the coating were tested as described hereinbefore and the results are given in the following Table I.

EXAMPLE 2

An epoxy resin coating composition was prepared analogously to Example 1a) except that the ratio of epoxy vesin: 2-phenyl-2-imidazoline was 74 P : 3 P. Large pipes were coated with this composition analogously to Example 1b and the same good test values of the coatings were obtained as in Example 1.

EXAMPLE 3

An epoxy resin coating composition was prepared analogously to Example 1a except that the ratio of epoxy resin : 2-phenyl-2-imidazoline was 71 P : 6 P. Large pipes were then coated with this composition analogously to Example 1b) and the same good test values of the coatings were obtained as in Example 1.

EXAMPLE 4

An epoxy resin coating composition was prepared analogously to Example 1a) except that an epoxy resin mixture containing 90% by weight of the epoxy resin used in Example 1a and 10% by weight of an epoxy resin with an epoxy equivalent weight of 1500 to 2000 was used, and the ratio of epoxy resin: 2-phenyl-2-imidazoline was 73.4 P : 3.6P. Pipes were then coated with this composition analogously to Example 1b) and the same good test values of the coatings were obtained as in Example 1.

EXAMPLE 5

An epoxy resin coating composition was prepared analogously to Example 1a except that the ratio of epoxy resin: 2-phenyl-2-imidazoline was 71 P : 6 P, no pigment was used and the amount of silicon dioxide was increased to 3% by weight. Coated pipes manufactured using this composition were distinguished by an extraordinarily high impact strength.

EXAMPLE 6 (a)

Preparation of a powdered epoxy resin coating composition 75.0 P of a coarsely ground epoxy resin (maximum particle size approximately 1 mm) based on 4,4'-diphenylolpropane and epichlorohydrin [softening point (according to Durrans): 93° C to 104° C; epoxy equivalent weight 875–1000; viscosity: 430–630 cP in 40% solution (measured in ethylene glycol dibutyl ether at 25° C)], 3.0 P of a flow agent concentrate (MODAFLOW ® manufactured by Monsanto) consisting of the abovementioned epoxy resin and a polyacrylate in a weight ratio of 9:1, 2.0 P imidazole (melting point 90° C, determined according to the capillary method), 13.0 P of titanium dioxide KRONOS RN 57 P (KRONOS is a trade mark, manufactured by Kronos Titangesellschaft mbH.), 5.0 P of chromium oxide GX (manufactured by Bayer AG.) and 2.0 P of highly dispersed silicon dioxide were mixed for 5 minutes in a sealed, fast-rotating mixer, for 5 minutes at 1600 rpm (revolutions per minute), the mixer being simultaneously cooled with water.

The mixture was plasticized and homogenized under the following conditions in a twin-screw extruder ZDS-K 83 (manufactured by Werner & Pfleiderer, Stuttgart, Germany). Temperature of entrance: 5° to 15° C; temperature of screws: 50° C; temperatures of part of housing I and II: 70° C; temperature of outlet part of housing: 105° C; temperature of nozzle: 70° C; temperature of the molten homogenized mixture: 110° C; revolution rate of the kneading screws: 300 rpm. The molten homogenized epoxy resin material was rolled out flat on two rollers, rotating in opposite directions and filled with cooling brine, whereby it was intensively cooled, and then was passed via an outlet caterpillar track on to a water-cooled steel belt, where an additional countercurrent of cold air was blown on to the epoxy resin material from above. The cooled epoxy resin material was coarsely ground, in known manner, e.g. in a blade mill. It was then finely ground in a sifter mill while being classified at the same time. The maximum particle size of the powdered composition was in the range 80 to 90 micron for electrostatical spraying and about 300 micron for whirl sintering process.

b. Manufacture of coated pipes

Large pipes were heated by means of ring or line burners arranged in a star shape. The pipes were moved along and rotated until they showed a constant temperature of 250° ± 10° C over the total length of the pipe. The subsequent electrostatic application of the powdered coating composition to form a layer 300 microns thick was carried out according to conventional methods. The heat capacity of the large heated pipes was quite adequate to effect chemical cross-linking. The properties of the coating were tested as described hereinbefore and the results correspond to those of Example 1.

EXAMPLE 7

The epoxy resin composition according to Example 6 a) was applied by a whirl sintering coating process to large pipes which were heated to 250° ± 10° C.

EXAMPLE 8

An epoxy resin coating composition was prepared analogously to Example 6a) except that imidazole was substituted by an adduct, prepared from imidazole and an epoxy resin based on 4,4'-diphenylolpropane and epichlorohydrin with an epoxy equivalent weight of 185–195 in the ratio of imidazole: epoxy resin of 26.3 P : 73.7 P. The ratio of epoxy resin of Example 1: imidazole adduct was 74.5 P : 2.5 P. Large pipes were coated with this composition analogously to Example 6b) and the same good test values of the coatings were obtained as in Example 1.

EXAMPLE 9

An epoxy resin coating composition was prepared analogously to Example 6a) except that the hardener was a mixture of imidazole with 2-phenyl-2-imidazoline with the ratio 0.6 P : 3.3 P. The ratio of epoxy resin of Example 1 to this mixture was 73.1 P : 3.9 P. Large pipes were coated with this composition analogously to Example 6b and the same good test values of the coatings were obtained as in Example 1.

EXAMPLE 10

An epoxy resin coating composition was prepared analogously to Example 6a) except that the hardener is a mixture of 3 P of an adduct of Example 8 and 3 P of 2-phenyl-2-imidazoline. The ratio of epoxy resin used in Example 1 to this mixture is 71 P : 6 P. Pipes were coated with this composition analogously to Example 6a) and the same good test values of the coatings were obtained as in Example 1.

EXAMPLE 11

An epoxy resin composition was prepared analogously to Example 6a). Large pipes were heated to a temperature of 200° ± 10° C, coated in known manner by a whirl-sintering coating process with this coating composition which was then cured for 5 minutes at 200° ± 10° C.

COMPARISON EXAMPLE 1

An epoxy resin coating composition was prepared analogously to Example 1a) but using only 61 P of epoxy resin and instead of the 2-phenyl-2-imidazoline, 16 P of 2-acetyl-glycerine esterified in the 1- and 3-positions which one molecule of trimellitic anhydride. Pipes were coated with this composition analogously to Example 1b) and the test values of the coatings are given in Table I.

COMPARISON EXAMPLE 2

A epoxy resin coating compositon was prepared analogously to Example 1a but using as component (B) instead of 2-phenyl-2-imidazoline a modified dicyanodiamide containing 85 P of dicyanodiamide, 9.5 P of 2-ethyl-4-methyl-imidazole and 5.3 P of an epoxy resin based on Bisphenol A with an epoxy number of 190.

Table I

| Test methods for large laminated pipes | Example 1 | Compar. 1 | Compar. 2 |
|---|---|---|---|
| A) Storage in 1 N NaOH solution at 50° C Duration of test: 6 months | 0 | 3 | 3 |
| B) Boiling test in distilled water Duration of test: 240 hours | 0 | 3 | 3 |
| C) Boiling test in tap water Duration of test: 240 hours | 0 | 3 | 3 |
| D) Bending test according to DIN 53152 and DIN 1605 | 0 | 1 | 2 |
| E) Absence of pores according to preliminary standard DIN 30670 | 0 | 0 | 1 |
| F) Impact resistance according to preliminary standard DIN 30670 | 0 | 1 | 2 |

Evaluation: 0 = best mark
5 = worst mark  (according to DIN 53230)

The gel time of Examples 6, 8, 9 and 10 was ascertained, additionally elasticity, impact strength and resistance to aceton were tested on coatings of 70 micron thickness on bondered sheet metal of 0.75 mm thickness obtained by curing for 5 minutes at 180° C (see results in following Table II).

Table II

| Example | Imidazole parts b.w. acc. Examples | Adduct based on Imidazole acc. Ex. 8 | 2-phenyl-2-imidazoline | Gel time 180° [sec] | Erichsen (DIN 53156) [mm] | Impact strength Gardener [inch × pound] (reverse) | Aceton resistance (DIN 53230) |
|---|---|---|---|---|---|---|---|
| 6 | 2.0 | — | — | 31 | 10.8 | 60 | 0.5 |
| 8 | — | 2.5 | — | 25 | 9.3 | 145 | 0.5 |
| 9 | 0.6 | — | 3.3 | 29 | 10.2 | 180 | 0.5 |
| 10 | — | 3.0 | 3.0 | 21 | 10.7 | 190 | 0.5 |

We claim:

1. An article comprising a metal substrate in the form of a pipe having at least 100 mm internal diameter or a container, said substrate being coated with a single at least 100 micron thick coating of a hardened epoxy resin composition formed from a homogenized solid mixture of (A) a solid epoxy resin based on epichlorohydrin and a component selected from the group consisting of (a) 4,4'-diphenylolpropane, b) 4,4'-diphenylolmethane and (c) a combination of (a) and (b), (B) from 1 to 12% by weight based on the epoxy resin of at least one hardener for said epoxy resin selected from the group consisting of (a) compounds of formula

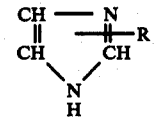

(I)

wherein R is hydrogen or an alkyl group of 1 to 6 carbon atoms or an aromatic hydrocarbon residue with 6 to 10 carbon atoms, (b) compounds of formula

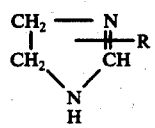

(II)

wherein R is hydrogen or an alkyl group having 1 to 6 carbon atoms or an aromatic hydrocarbon residue with 6 to 10 carbon atoms and (c) an adduct of any one of the hardener compounds (a) and (b) to an epoxy resin with an epoxy equivalent weight of from 50 to 2000, (C) a flow improving amount of a flow agent of 0.1 up to 5% by weight based on the epoxy resin and (D) a thixotropic agent in an amount of 1 to 5% by weight of the total composition.

2. An article as claimed in claim 1 wherein component (B) was applied in an amount of from 3 to 9% by weight of the epoxy resin.

3. An article as claimed in claim 1 wherein the epoxy resin component (A) when first coated has an epoxy equivalent weight of from 600 to 2000.

4. An article as claimed in claim 1 wherein the epoxy resin component (A) when first coated is a mixture of epoxy resins with different epoxy equivalent weights and which when first coated contains from 5 to 20% by weight of an epoxy resin with an epoxy equivalent weight of from 1500 to 2000.

5. An article as claimed in claim 1 wherein the coating additionally contains a pigment up to 40% by weight.

6. An article as claimed in claim 1 wherein the metal substrate is a pipe of 300 to 1600 mm internal diameter.

7. An article as claimed in claim 1 wherein the epoxy resin of the adduct has an epoxy equivalent weight of from 100 to 500.

8. An article comprising a metal substrate in the form of a pipe having at least 100 mm internal diameter or container obtained by heating said substrate to a temperature above the melting temperature of the epoxy resin component of the solid mixture defined in claim 1 sufficient to cure the epoxy resin thereof, and powder-coating the said epoxy resin composition onto the hot surface of the substrate to provide a substantially uniform coating thereon at least 100 microns thick by immediate curing and hardening of the epoxy resin without any further processing step by means of the heat capacity of the hot substrate.

9. An article as claimed in claim 8 in said solid mixture wherein (at least one of the following features was applied:

g. the epoxy resin of component A) has had an epoxy equivalent weight of from 700 to 1500,
h. component (B) is selected from the group 2-phenyl-2-imidazoline, imidazole, a mixture of these substances and an adduct of an epoxy resin having an epoxy equivalent weight of from 185 to 195 with one of these compounds,
i. component (C) was present in an amount of up to 5% by weight based on the epoxy resin and component D) was present in an amount of 1 to 5% by weight of the total composition.
j. the thickness of the coating is from 100 to 2000 micron.

10. A process of coating a metal substrate in the form of a pipe having at least 100 mm internal diameter or a container which comprises (1) providing an epoxy resin coating composition formed from a homogenized solid mixture of (A) a solid epoxy resin based on epichlorohydrin and a component selected from the group consisting of (a) 4,4'-diphenylolpropane, (b) 4,4'-diphenylolmethane and (c) a combination of (a) and (b), (B) from 1 to 12% by weight based on the epoxy resin of at least one hardener for said epoxy resin selected from the group consisting of (a) compounds of formula

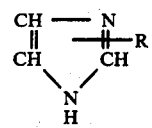

wherein R is hydrogen or an alkyl group of 1 to 6 carbon atoms or an aromatic hydrocarbon residue with 6 to 10 carbon atoms, (b) compounds of formula

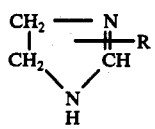

wherein R is hydrogen or an alkyl group having 1 to 6 carbon atoms or an aromatic hydrocarbon residue with 6 to 10 carbon atoms and (c) an adduct of any one of the hardener compounds (a) and (b) to an epoxy resin with an epoxy equivalent weight of from 50 to 2000, (C) a flow imparting amount of a flow agent of 0.1 up to 5% by weight based on the epoxy resin and D) a thixotropic agent in an amount of 1 to 5% by weight of the total composition and (2) heating said substrate to a temperature above the melting temperature of the epoxy resin component of said mixture and sufficient to cure the epoxy resin thereof, and powder-coating the said epoxy resin mixture onto the hot surface of the substrate to provide a substantially uniform coating thereon at least 100 microns thick by immediate hardening without any further processing step by means of the heat capacity of the hot substrate.

11. A process as claimed in claim 10 wherein the substrate is heated to a temperature of 210° to 330° C.

12. A process as claimed in claim 12 wherein the maximum particle size of the epoxy resin composition applied to the substrate has been in the range from 60 to 100 microns and the powder-coating step is performed either by spraying or electrostatically.

* * * * *